(12) United States Patent
Amini et al.

(10) Patent No.: US 7,822,604 B2
(45) Date of Patent: Oct. 26, 2010

(54) METHOD AND APPARATUS FOR IDENTIFYING CONVERSING PAIRS OVER A TWO-WAY SPEECH MEDIUM

(75) Inventors: Lisa Amini, Yorktown Heights, NY (US); Eric Bouillet, Englewood, NJ (US); Olivier Verscheure, Hopewell Junction, NY (US); Michail Vlachos, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 1029 days.

(21) Appl. No.: 11/555,199

(22) Filed: Oct. 31, 2006

(65) Prior Publication Data

US 2008/0103770 A1    May 1, 2008

(51) Int. Cl.
G10L 15/20 (2006.01)

(52) U.S. Cl. .................. 704/233; 704/245; 704/239

(58) Field of Classification Search ................ 704/245, 704/221, 246, 249, 236, 243, 270, 270.1, 704/233, 224, 238, 239, 252
See application file for complete search history.

(56) References Cited

U.S. PATENT DOCUMENTS

| | | | | |
|---|---|---|---|---|
| 5,598,507 A | * | 1/1997 | Kimber et al. | 704/246 |
| 6,748,356 B1 | * | 6/2004 | Beigi et al. | 704/245 |
| 7,295,970 B1 | * | 11/2007 | Gorin et al. | 704/221 |

* cited by examiner

*Primary Examiner*—Huyen X. Vo

(57) ABSTRACT

One embodiment of the present method and apparatus for identifying a conversing pair of users of a two-way speech medium includes receiving a plurality of binary voice activity streams, where the plurality of voice activity streams includes a first voice activity stream associated with a first user, and pairing the first voice activity stream with a second voice activity stream associated with a second user, in accordance with a complementary similarity between the first voice activity stream and the second voice activity stream.

29 Claims, 4 Drawing Sheets

METHOD AND APPARATUS FOR IDENTIFYING CONVERSING PAIRS OVER A TWO-WAY SPEECH MEDIUM

REFERENCE TO GOVERNMENT FUNDING

This invention was made with Government support under Contract No. H98230-05-3-0001 awarded by Intelligence Agencys. The Government has certain rights in this invention.

FIELD OF THE INVENTION

The present invention relates generally to speech communications and relates more particularly to identifying users of two-way speech media.

BACKGROUND

Voice over Internet Protocol (VoIP) is a technology that enables the routing of voice communications over any IP-based network, such as the public Internet. In VoIP, the voice data flows over a general-purpose packet-switched network rather than over the traditional circuit-switched Public Switched Telephone Network (PSTN).

While migration to VoIP systems has been steadily increasing, security risks associated with the technology still remain. For example, preserving the confidentiality of VoIP communications is important, and is typically achieved by employing call authentication and encryption mechanisms. Also important is preserving the anonymity of VoIP users, which encompasses both the identities of the users and their caller/callee relationship (voice stream pair). Anonymity is often preserved using overlay networks that conceal the IP addresses of the conversing parties. In some instance, however (for example, in security applications), it may be desirable to identify at least a conversing pair of VoIP users, or generally users of any two-way speech communications medium.

Thus, there is a need in the art for a method and apparatus for identifying conversing pairs over a two-way speech medium.

SUMMARY OF THE INVENTION

One embodiment of the present method and apparatus for identifying a conversing pair of users of a two-way speech medium includes receiving a plurality of binary voice activity streams, where the plurality of voice activity streams includes a first voice activity stream associated with a first user, and pairing the first voice activity stream with a second voice activity stream associated with a second user, in accordance with a complementary similarity between the first voice activity stream and the second voice activity stream.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

In one embodiment, the present invention is a method and apparatus for identifying conversing pairs of users of two-way speech communications media. Although the invention will be described within the context of Voice over IP networks, it will be appreciated that the concepts of the present invention are applicable to any kind of speech medium in which two-way communications take place (e.g., VoIP, landline, etc.). Embodiments of the present invention leverage the power of complementary similarity measures in order to detect coordinated and complementary speech patterns between conversing speakers. In particular, embodiments of the present invention rely on the key intuition that conversing parties tend to follow a complementary speech pattern (i.e., when one party speaks, the other party listens). This turn-taking of conversation represents a basic rule of communication, although it is not expected that all conversations will strictly follow this rule. The present invention does not necessarily reveal the identities of the conversing parties, but can be implemented to match voice streams that represent parties engaged in a common conversation (i.e., conversing with each other).

Figure 1:
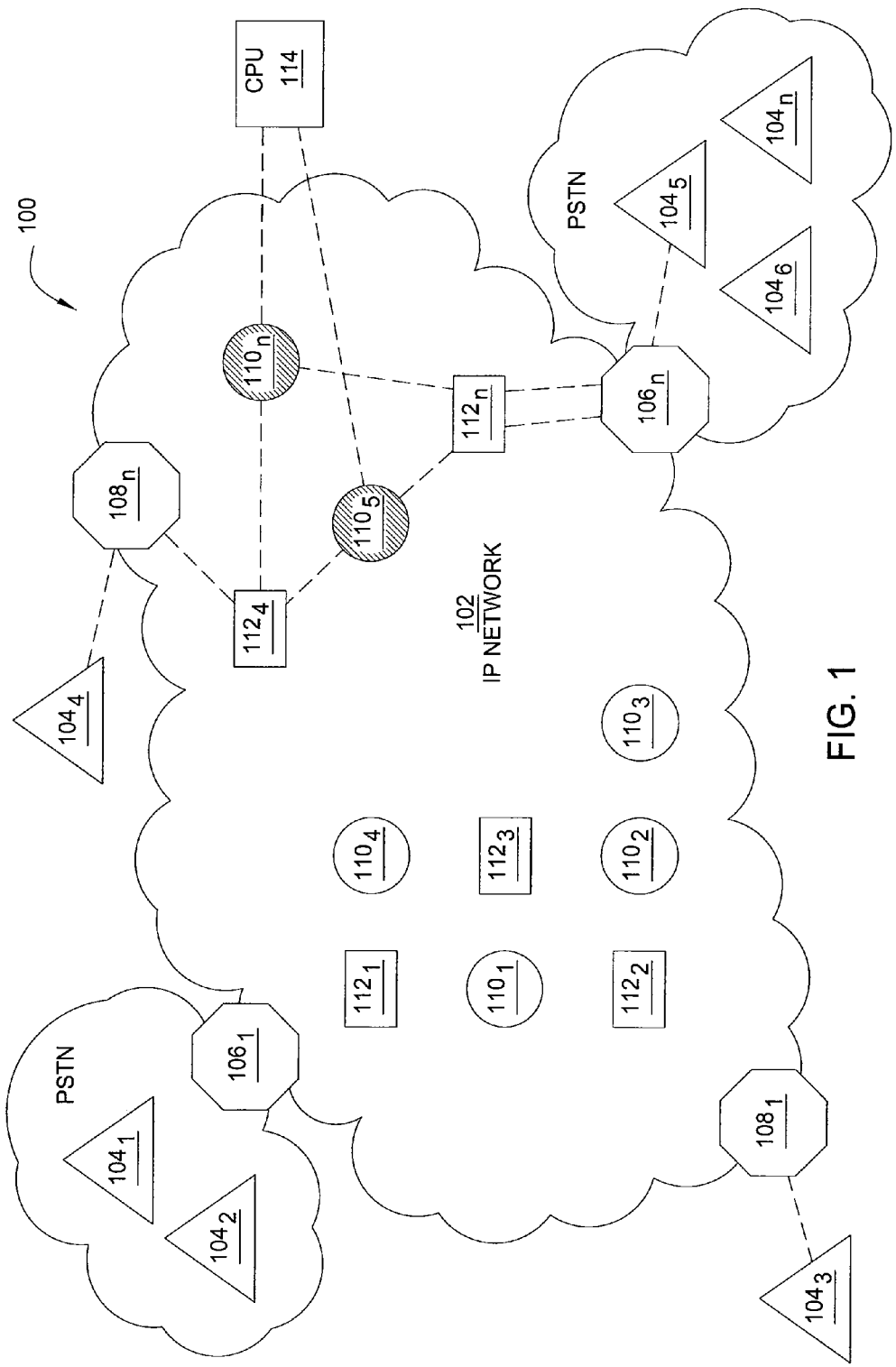
FIG. 1 is a schematic diagram illustrating one embodiment of a Voice over Internet Protocol (VoIP) framework, according to the present invention.

FIG. 1 is a schematic diagram illustrating one embodiment of a Voice over Internet Protocol (VoIP) framework 100, according to the present invention. The VoIP framework 100 comprises a plurality of VoIP customers $104_1$-$104_n$ (hereinafter collectively referred to as "customers 104") connected to an IP network 102 via respective internet service providers (ISPs) $108_1$-$108_n$ (hereinafter collectively referred to as "ISPs 108") or via VoIP gateways $106_1$-$106_n$ (hereinafter collectively referred to as "gateways 106") on traditional PSTNs. In addition, the VoIP framework 100 comprises a plurality of IP routers $110_1$-$110_n$ (hereinafter collectively referred to as "routers 110") and an anonymizing network of overlay nodes $112_1$-$112_n$ (hereinafter collectively referred to as "overlay nodes 112") that conceal the IP addresses of conversing parties.

In operation, voice signals are continuously captured (e.g., by microphones incorporated in communication devices) in digital form at customer sites 104. The voice signals are then segmented filtered in order to detect whether or not a customer associated with a given voice signal is speaking. For instance, when the voice activity falls below a predefined threshold, a current segment of the voice signal may be dropped. In embodiments where the two-way speech communications medium is not a VoIP network, a Voice Activity Detection (VAD) unit is used to perform voice activity detection/filtering. Filtered segments of the voice signal are then passed though a voice codec unit that compresses, encrypts and packetizes the segments into Real-time Transport Protocol (RTP) packets. Each RTP packet is then written to a network socket.

In accordance with the present invention, a subset of the routers 110 (i.e., shaded routers $110_S$ and $110_n$ in FIG. 1) in the VoIP framework 100 are VoIP sniffers that identify and separate different voice streams and convert the voice streams into binary voice activity streams indicating periods of activity or silence, in accordance with one or more headers of the RTP packets. Specifically, the routers/sniffers 110 segregate the VoIP packets from different data traffic (e.g., using the Payload Type header field), track different voice streams (e.g., using the different Synchronization Source header fields) and generate binary streams that take a value of one when the associated customer speaks and zero when the associated customer is silent (e.g., by identifying successive RTP timestamp values for a given Synchronization Source value). That is, a router/sniffer 110 measures the inter-departure time of packets belonging to a given voice stream (difference of two consecutive timestamp values) and generates a one if the difference is equal to a segmentation interval (e.g., of 20 ms), or a zero if the difference is larger than the segmentation interval. Thus each binary stream results from the aperiodic inter-departure time of VoIP packets resulting from the VAD performed within a customer's communication device.

Once the binary streams have been generated, the sniffers/routers 110 forward the binary streams to a central processing unit (CPU) 114. As will be described in greater detail below, the central processing unit processes these binary streams in order to identify two-way conversing pairs of VoIP customers 104 (i.e., relationships $S_i \leftrightarrow S_j$). The set of binary streams received by the CPU 114 at any point in time is herein referred to as S, where the cardinality of S varies with time (i.e., calls coming and going). A subset of binary streams $\{S_1, S_2, \ldots, S_n\}$ received within a particular time interval is referred to as n.

Figure 2:
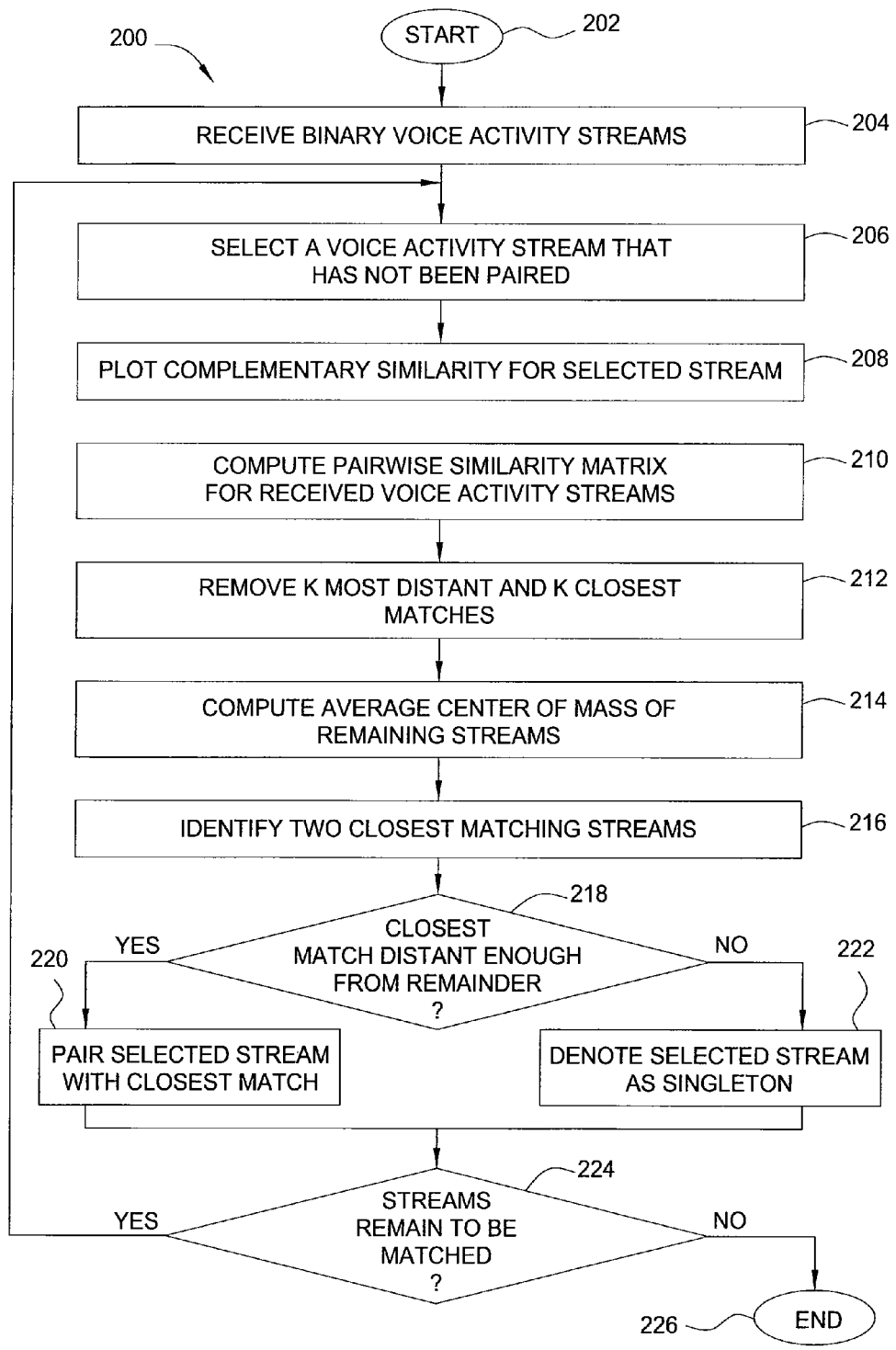
FIG. 2 is a flow diagram illustrating one embodiment of a method for identifying conversing pairs of VoIP customers in a VoIP network, according to the present invention.

FIG. 2 is a flow diagram illustrating one embodiment of a method 200 for identifying conversing pairs of VoIP customers in a VoIP network, according to the present invention. The method 200 may be implemented, for example, by a central processing unit (e.g., CPU 114 of FIG. 1) that receives binary voice activity streams from one or more routers/sniffers in a VoIP network.

The method 200 is initialized at step 202 and proceeds to step 204, where the method 200 receives one or more binary voice activity streams (e.g., from routers/sniffers). The method 200 then proceeds to step 206 and selects a voice activity stream that has not yet been paired with a second voice activity stream.

Figure 3:
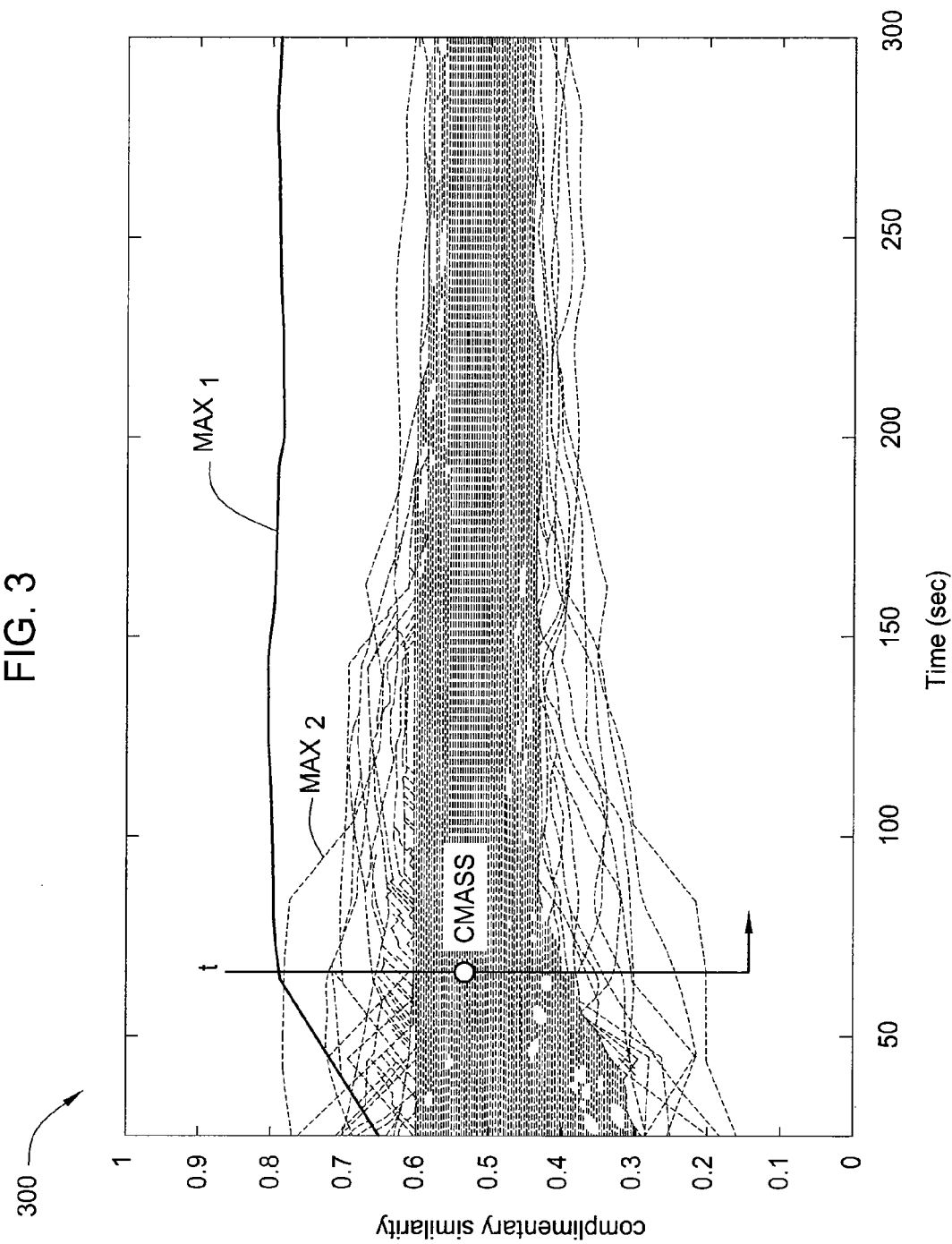
FIG. 3 is an exemplary line graph plotting, for each pair of voice activity streams including a selected voice activity stream, the complementary similarity versus time.

In step 208, the method 200 plots how the complementary similarity of the selected voice activity stream progresses over time against all of the other received voice activity streams. Complementary similarity between two voice activity streams $S_i$ and $S_j$ is defined as the degree of coordination between speakers i and j, such that the binary complement of the time series $S_j$ may be interpreted as speaker j being silent (i.e., listening). For example, FIG. 3 is an exemplary line graph 300 plotting, for each pair of voice activity streams including a selected voice activity stream, the complementary similarity (y axis) versus time (x axis). As illustrated by FIG. 3, voice pairing is relatively ambivalent during the initial stages of conversation (e.g., before time t), but the uncertainty decreases as conversation progresses (e.g., after time t). Thus, the most complementary similar voice activity stream to the selected voice activity stream is the one that exhibits the highest complementary similarity after time t.

In one embodiment, the complementary similarity between the selected voice activity stream and a second voice activity stream is calculated in accordance with at least one of the following metrics: an asymmetric measure, a symmetric measure or a mutual information measure.

An asymmetric measure of the complementary similarity between the voice streams $S_i$ and $S_j$ is determined by computing the intersection between $S_i$ and the binary complement of $S_j$ normalized by their union. Thus, the complementary similarity, Cim-asym (i, j, T), between the voice streams $S_i$ and $S_j$ over T units of time may be asymmetrically measured according to:

$$Cim-asym(i, j, T) = \frac{\sum_{t=1}^{T} S_i[t] \wedge \neg S_j[t]}{\sum_{t=1}^{T} S_i[t] \vee \neg S_j[t]} \quad \text{(EQN. 1)}$$

where $S_k(t) \in \{0, 1\}$ is the binary value for speaker k at time t, and the symbols $\wedge$, $\vee$, and $\neg$ denote, respectively, the binary AND, OR and NOT operators. Thus, in general, Cim-asym (i, j, T) $\neq$ Cim-asym (j, i, T). This measure is also easy to update incrementally as T increases. For example, if $V\wedge(i, j)$ and $V\vee(i, j)$ respectively denote the running values of the numerator and denominator of EQN. 1, then Cim-asym (i, j, T) for any elapsed time, T, is given by the ratio of $V\wedge(i, j)$ to $V\vee(i, j)$. Thus, given n binary streams, incrementally computing the complementary similarity requires keeping two times n(n–1) values in memory.

A symmetric measure of the complementary similarity, Cim-sym (i, j, T), between the voice streams $S_i$ and $S_j$ over T units of time may be computed according to:

$$Cim-sym(i, j, T) = \sum_{t=1}^{T} \frac{(S_i[t] \wedge \neg S_j[t]) \vee (\neg S_i[t] \wedge S_j[t])}{T} \quad \text{(EQN. 2)}$$

$$= \sum_{t=1}^{T} \frac{XOR(S_i[t], S_j[t])}{T}$$

where, given n binary streams, incrementally computing Cim-sym (i, j, T) requires keeping only $$\binom{n}{2}$$

values in memory thanks to the symmetric nature of EQN. 2.

A mutual information measure of the complementary similarity between the voice streams $S_i$ and $S_j$ is a measure of how much information can be obtained about $S_i$ by observing $S_j$. In this case, $p_{i,j}(x,y)$, $p_i(x)$ and $p_j(y)$ with x,y $\in$ 0,1 denotes the joint and marginal running averages for speakers i and j after T units of time. For example, $$p_{i,j}(0, 1) = \frac{1}{T}\sum_{t=1}^{T} \neg S_i[t] \wedge S_j[t]$$

Thus, the mutual information MI, between the voice streams $S_i$ and $S_j$ may be computed according to:

$$MI = \sum_{x,y \in 0,1} p_{i,j}(x, y) \log_2 \frac{p_{i,j}(x, y)}{p_i(x)p_j(y)} \quad \text{(EQN. 3)}$$

Given n binary streams, incrementally computing the mutual information requires keeping three times $$\binom{n}{2}$$

values in memory, thanks to the symmetrical nature of EQN. 3.

Referring back to FIG. 2, once the complementary similarity has been plotted, the method 200 proceeds to step 210 and computes a pairwise similarity matrix, M, after some time, T, for the received voice activity streams, where each entry in the matrix, M, provides the complementary similarity between two streams:

$$M(i,j) = Cim(i,j,T) \quad (\text{EQN. 4})$$

where Cim is a complementary similarity measure such as one of the complementary similarity measures discussed above (e.g., Cim-asym, Cim-sym or MI).

In one embodiment, speakers i and j can then be paired if:

$$M(i,j) = \max_l \{M(i,l)\} \quad (\text{EQN. 5})$$

and $$M(i,j) = \max_l \{M(l,j)\} \quad (\text{EQN. 6})$$

where l is the index over which the operator max is applied. Thus, EQN. 5 instructs that all elements of row i of matrix M (i.e., over all columns of row i) are gathered, and then the maximum value is selected and stored in M(i,j). This approach may be referred to as hard clustering, because at each time instance it provides a rigid assessment of pairs, without providing any hints about the confidence or ambiguity of the matching.

However, in further embodiments, once the pairwise similarity matrix has been computed, the method 200 proceeds to step 212 and removes both the k streams that are most complementary similar to the selected voice activity stream and the k streams that are least complementary similar to the selected voice activity stream from the plot. In one embodiment, k is an integer between two and five.

In step 214, the method 200 computes the average center of mass, cMass, for the remaining voice activity streams. The center of mass is simply a weighted average. Thus, for example, if all weights are equal to one, the center of mass trivializes to the sample mean.

Once the average center of mass has been computed, the method 200 proceeds to step 216 and identifies the two voice activity streams that are most complementary similar to the selected voice activity streams, respectively denoted as $\max_1$ and $\max_2$. In step 218, the method 200 determines whether the most complementary similar voice activity stream, $\max_1$, is sufficiently separated from the remainder of the voice activity streams. In one embodiment, the most complementary similar voice activity stream is sufficiently separated from the remainder if $$\max_1 - \max_2 > f(\max_2 - c\text{Mass}) \quad (\text{EQN. 7})$$

where f is a constant capturing the assurance (confidence) about the quality of the match of the selected voice activity stream to the most complementary similar voice activity stream.

If the method 200 concludes in step 218 that the most complementary similar voice activity stream, $\max_1$, is sufficiently separated from the remainder of the voice activity streams, then the method 200 proceeds to step 220 and matches the selected voice activity stream with the most complementary similar voice activity stream, $\max_1$. In one embodiment, pairing of the selected voice activity stream with the most complementary similar voice activity stream, $\max_1$, includes removing the rows and columns in the pairwise similarity matrix that correspond to the selected voice activity stream and to the most complementary similar voice activity stream, max.

Alternatively, if the method 200 concludes in step 218 that the most complementary similar voice activity stream, $\max_1$, is not sufficiently separated from the remainder of the voice activity streams, the method 200 proceeds to step 222 and denotes the selected voice activity stream as a singleton, meaning that the method 200 cannot make a decision regarding the selected voice activity stream.

Once the method 200 has either paired the selected voice activity stream with a second voice activity stream (i.e., in accordance with step 220) or marked the selected voice activity stream as a singleton (i.e., in accordance with step 222), the method 200 proceeds to step 224 and determines whether any voice activity streams remain to be matched.

If the method 200 concludes in step 224 that there is at least one voice activity stream that remains to be matched, the method 200 returns to step 206 and selects a next voice activity stream for processing in accordance with the method described above. Alternatively, if the method 200 concludes in step 226 that no voice activity streams remain to be matched, the method 200 terminates in step 226.

Thus, the method 200 substantially functions as an outlier detection scheme that examines whether the closest match to a selected voice activity stream is sufficiently distant from the majority of other voice activity streams. Thus, when comparing a voice activity stream (say, stream A) against all others, the most likely matching candidate should not only hold the maximum degree of complementary similarity, but also should deviate sufficiently from the complementary similarities of the remaining voice activity streams. The method 200 thereby identifies, for a given voice activity stream representing the voice activity of a first VoIP user, the voice activity stream that most likely represents the voice activity of a second VoIP user with whom the first VoIP user is conversing. Thus, the method 200 efficiently identifies conversing pairs of VoIP users.

The method 200, which may be regarded as a progressive clustering technique, provides some advantages with regard to the hard clustering approach described earlier. For example, the method 200 avoids continuous pairwise distance computation by leveraging the progressive removal of already paired voice activity streams from the pairwise similarity matrix. In addition, the method 200 produces substantially fewer incorrect pairings by reducing the aggressiveness of the pairing protocol, which, in practice, will have a small impact on the convergence rate when compared to the hard clustering approach, as the constant f in EQN. 7 essentially tunes the convergence rate. That is, smaller values of f make the pairing protocol more elastic in its pairing decisions (hence achieving faster convergence but possibly introducing a larger number of incorrectly paired streams), while larger values of f restrict the pairing protocol into making more conservative decisions (resulting in fewer mistakes at the expense of more prolonged convergence times).

Figure 4:
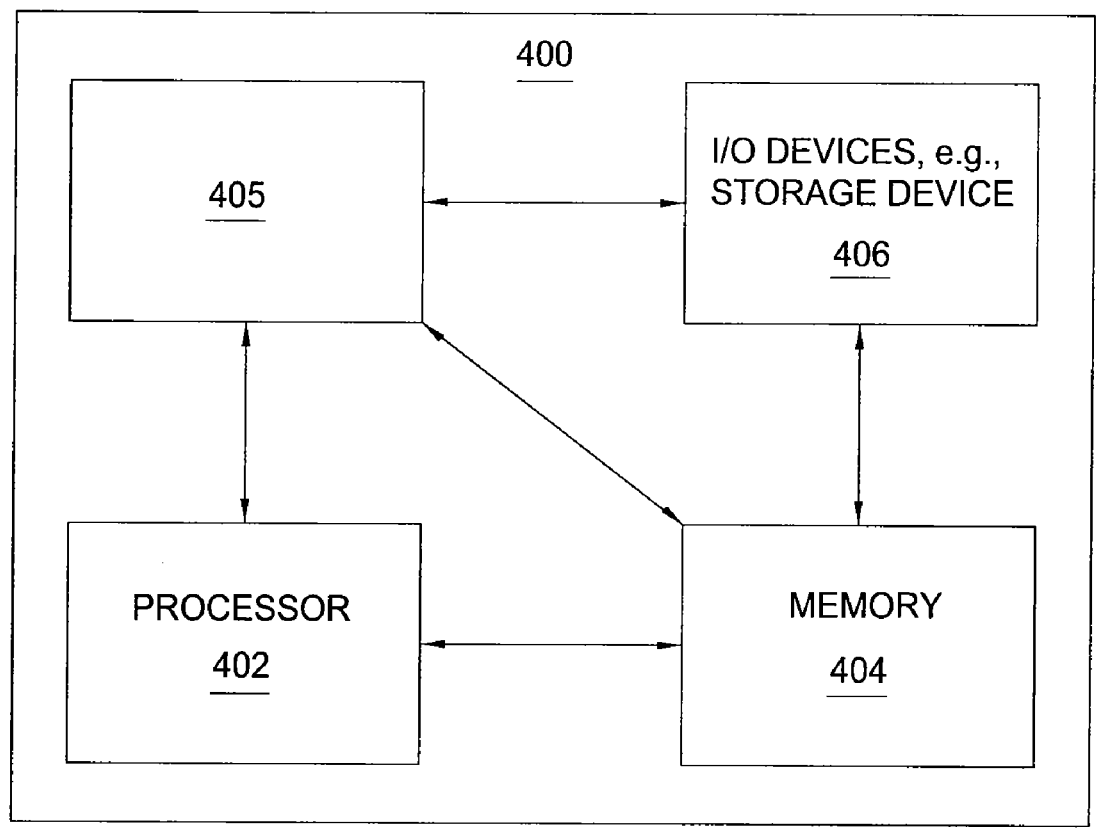
FIG. 4 is a high level block diagram of the pairing method that is implemented using a general purpose computing device.

FIG. 4 is a high level block diagram of the pairing method that is implemented using a general purpose computing device 400. In one embodiment, a general purpose computing device 400 includes a processor 402, a memory 404, a pairing module 405 and various input/output (I/O) devices 406 such as a display, a keyboard, a mouse, a modem, and the like. In one embodiment, at least one I/O device is a storage device (e.g., a disk drive, an optical disk drive, a floppy disk drive). It should be understood that the pairing module 405 can be implemented as a physical device or subsystem that is coupled to a processor through a communication channel.

Alternatively, the pairing module 405 can be represented by one or more software applications (or even a combination of software and hardware, e.g., using Application Specific Integrated Circuits (ASIC)), where the software is loaded from a storage medium (e.g., I/O devices 406) and operated by the processor 402 in the memory 404 of the general purpose computing device 400. Thus, in one embodiment, the pairing module 405 for identifying conversing pairs of users in a VoIP network described herein with reference to the preceding Figures can be stored on a computer readable medium or carrier (e.g., RAM, magnetic or optical drive or diskette, and the like).

Those skilled in the art will appreciate that the methods of the present invention may have application outside the task of pairing conversing users of speech communications media. For instance, the techniques of conversion to binary streams, along with progressive clustering, could be used for general automated pairing of voice conversations given a large data set of voice data. Alternatively, the progressive clustering technique could be used for efficient resource balancing/management given a set of system measurements. In this case, the present invention could be implemented to identify processes executing in a computer system that have complementary system utilization. Such techniques could also be extended to applications such as multimedia (e.g., video) applications that balance media streams arriving from a plurality of servers, given different inter-arrival rates among the various streams.

Thus, the present invention represents a significant advancement in the field of speech communications. Embodiments of the present invention leverage the power of complementary similarity measures in order to detect coordinated and complementary speech patterns between conversing speakers. The present invention does not necessarily reveal the identities of the conversing parties, but can be implemented to match voice streams that represent parties engaged in a common conversation (i.e., conversing with each other).

While the foregoing is directed to the preferred embodiment of the present invention, other and further embodiments of the invention may be devised without departing from the basic scope thereof, and the scope thereof is determined by the claims that follow.

The invention claimed is:

1. A method for identifying a conversing pair of users of a two-way speech medium, the method comprising:
   receiving a plurality of binary voice activity streams, where the plurality of binary voice activity streams includes a first voice activity stream associated with a first user; and
   pairing the first voice activity stream with a second voice activity stream associated with a second user, in accordance with a complementary similarity between the first voice activity stream and the second voice activity stream, wherein the complementary similarity is an asymmetric measure obtained by computing an intersection between the first voice activity stream and the second voice activity stream, normalized by a union of the first voice activity stream and the second voice activity stream,
   wherein at least one of: said receiving and said pairing is performed using a processor.

2. The method of claim 1, wherein the complementary similarity is a measure of how much information about the first voice activity stream can be obtained by observing the second voice activity stream.

3. The method of claim 1, wherein the pairing comprises:
   generating a plot of a complementary similarity of the first voice activity stream over time against all of the plurality of binary voice activity streams; and
   identifying the second voice activity stream as a voice activity stream that exhibits a highest degree of complementary similarity to the first voice activity stream relative to a remainder of the plurality of binary voice activity streams, in accordance with the plot.

4. The method of claim 3, wherein the identifying comprises:
   computing a pairwise similarity matrix after some time for all of the plurality of binary voice activity streams, each entry in the matrix indicating a complementary similarity between two corresponding binary voice activity streams of the plurality of binary voice activity streams; and
   performing hard clustering in accordance with the matrix to pair the first voice activity stream with the second voice activity stream.

5. The method of claim 3, wherein the identifying further comprises:
   confirming, in accordance with the plot, that the second voice activity stream is sufficiently distant from the remainder of the plurality of binary voice activity streams.

6. The method of claim 5, wherein the confirming comprises:
   removing from the plot a first number of the plurality of binary voice activity streams that exhibit a highest degree of complementary similarity to the first voice activity stream relative to a remainder of the plurality of binary voice activity streams;
   removing from the plot a second number of the plurality of binary voice activity streams that exhibit a lowest degree of complementary similarity to the first voice activity stream relative to the remainder of the plurality of binary voice activity streams;
   computing an average center of mass for the remainder of the plurality of binary voice activity streams; and
   calculating a distance of the second voice activity stream from the remainder of the plurality of binary voice activity streams, in accordance with the average center of mass.

7. The method of claim 6, wherein the calculating comprises:
   identifying, in accordance with the plot, a third voice activity stream that exhibits a second highest degree of complementary similarity to the first voice activity stream relative to the remainder of the plurality of binary voice activity streams;
   subtracting a first complementary similarity measure for the third voice activity stream from a second complementary similarity measure for the second voice activity stream, to produce a first value;
   subtracting the first complementary similarity measure from the average center of mass to produce a second value;
   pairing the second voice activity stream with the first voice activity stream if the first value is greater than the second value multiplied by a constant; and designating the first voice activity stream as a singleton if the first value is not greater than the second value multiplied by the constant.

8. The method of claim 7, wherein the constant reflects a degree of confidence about a quality of a pairing of the first voice activity stream and the second voice activity stream.

9. The method of claim 1, further comprising:
removing rows and columns associated with the first voice activity stream and the second voice activity stream from a matrix, where the matrix is a pairwise similarity matrix after some time for all of the plurality of binary voice activity streams, each entry in the matrix indicating a complementary similarity between two corresponding binary voice activity streams of the plurality of binary voice activity streams.

10. A tangible computer readable medium containing an executable program for identifying a conversing pair of users of a two-way speech medium, where the program performs steps comprising:
receiving a plurality of binary voice activity streams, where the plurality of binary voice activity streams includes a first voice activity stream associated with a first user; and
pairing the first voice activity stream with a second voice activity stream associated with a second user, in accordance with a complementary similarity between the first voice activity stream and the second voice activity stream, wherein the complementary similarity is an asymmetric measure obtained by computing an intersection between the first voice activity stream and the second voice activity stream, normalized.

11. The tangible computer readable medium of claim 10, wherein the complementary similarity is a measure of how much information about the first voice activity stream can be obtained by observing the second voice activity stream.

12. The tangible computer readable medium of claim 10, wherein the pairing comprises:
generating a plot of a complementary similarity of the first voice activity stream over time against all of the plurality of binary voice activity streams; and
identifying the second voice activity stream as a voice activity stream that exhibits a highest degree of complementary similarity to the first voice activity stream relative to a remainder of the plurality of binary voice activity streams, in accordance with the plot.

13. The tangible computer readable medium of claim 12, wherein the identifying comprises:
computing a pairwise similarity matrix after some time for all of the plurality of binary voice activity streams, each entry in the matrix indicating a complementary similarity between two corresponding binary voice activity streams of the plurality of binary voice activity streams; and
performing hard clustering in accordance with the matrix to pair the first voice activity stream with the second voice activity stream.

14. The tangible computer readable medium of claim 12, wherein the identifying further comprises:
confirming, in accordance with the plot, that the second voice activity stream is sufficiently distant from the remainder of the plurality of binary voice activity streams.

15. The tangible computer readable medium of claim 14, wherein the confirming comprises:
removing from the plot a first number of binary voice activity streams of the plurality of binary voice activity streams that exhibit a highest degree of complementary similarity to the first voice activity stream relative to a remainder of the plurality of binary voice activity streams;
removing from the plot a second number of binary voice activity streams of the plurality of binary voice activity streams that exhibit a lowest degree of complementary similarity to the first voice activity stream relative to the remainder of the plurality of binary voice activity streams;
computing an average center of mass for the remainder of the plurality of binary voice activity streams; and
calculating a distance of the second voice activity stream from the remainder of the plurality of binary voice activity streams, in accordance with the average center of mass.

16. The tangible computer readable medium of claim 15, wherein the calculating comprises:
identifying, in accordance with the plot, a third voice activity stream that exhibits a second highest degree of complementary similarity to the first voice activity stream relative to the remainder of the plurality of binary voice activity streams;
subtracting a first complementary similarity measure for the third voice activity stream from a second complementary similarity measure for the second voice activity stream, to produce a first value;
subtracting the first complementary similarity measure from the average center of mass to produce a second value;
pairing the second voice activity stream with the first voice activity stream if the first value is greater than the second value multiplied by a constant; and
designating the first voice activity stream as a singleton if the first value is not greater than the second value multiplied by the constant.

17. The tangible computer readable medium of claim 16, wherein the constant reflects a degree of confidence about a quality of a pairing of the first voice activity stream and the second voice activity stream.

18. The tangible computer readable medium of claim 10, further comprising:
removing rows and columns associated with the first voice activity stream and the second voice activity stream from a matrix, where the matrix is a pairwise similarity matrix after some time for all of the plurality of binary voice activity streams, each entry in the matrix indicating a complementary similarity between two corresponding binary voice activity streams of the plurality of binary voice activity streams.

19. A system for identifying a conversing pair of users of a two-way speech medium, said system comprising:
means for receiving a plurality of binary voice activity streams, where the plurality of voice binary activity streams includes a first voice activity stream associated with a first user; and
means for pairing the first voice activity stream with a second voice activity stream associated with a second user, in accordance with a complementary similarity between the first voice activity stream and the second voice activity stream, wherein the complementary similarity is an asymmetric measure obtained by computing an intersection between the first voice activity stream and the second voice activity stream, normalized by a union of the first voice activity stream and the second voice activity stream.

20. The system of claim 19, wherein the complementary similarity is a measure of how much information about the first voice activity stream can be obtained by observing the second voice activity stream.

21. The system of claim 19, wherein the means for receiving and the means for pairing comprise a central processing unit coupled to a Voice over Internet Protocol network.

22. The system of claim 19, wherein the plurality of binary voice activity streams is received from one or more routers in a Voice over Internet Protocol network, the one or more routers having sniffer capabilities.

23. The system of claim 19, wherein the means for pairing comprises:
means for generating a plot of a complementary similarity of the first voice activity stream over time against all of the plurality of binary voice activity streams; and
means for identifying the second voice activity stream as a voice activity stream that exhibits a highest degree of complementary similarity to the first voice activity stream relative to a remainder of the plurality of binary voice activity streams, in accordance with the plot.

24. The system of claim 23, wherein the means for identifying comprises:
means for computing a pairwise similarity matrix after some time for all of the plurality of binary voice activity streams, each entry in the matrix indicating a complementary similarity between two corresponding binary voice activity streams of the plurality of binary voice activity streams; and
means for performing hard clustering in accordance with the matrix to pair the first voice activity stream with the second voice activity stream.

25. The system of claim 23, wherein the identifying further comprises:
means for confirming, in accordance with the plot, that the second voice activity stream is sufficiently distant from the remainder of the plurality of binary voice activity streams.

26. The system of claim 25, wherein the means for confirming comprises:
means for removing from the plot a first number of the plurality of binary voice activity streams that exhibit a highest degree of complementary similarity to the first voice activity stream relative to a remainder of the plurality of binary voice activity streams;
means for removing from the plot a second number of the plurality of binary voice activity streams that exhibit a lowest degree of complementary similarity to the first voice activity stream relative to the remainder of the plurality of binary voice activity streams;
means for computing an average center of mass for the remainder of the plurality of binary voice activity streams; and
means for calculating a distance of the second voice activity stream from the remainder of the plurality of binary voice activity streams, in accordance with the average center of mass.

27. The system of claim 26, wherein the means for calculating comprises:
means for identifying, in accordance with the plot, a third voice activity stream that exhibits a second highest degree of complementary similarity to the first voice activity stream relative to the remainder of the plurality of binary voice activity streams;
means for subtracting a first complementary similarity measure for the third voice activity stream from a second complementary similarity measure for the second voice activity stream, to produce a first value;
means for subtracting the first complementary similarity measure from the average center of mass to produce a second value;
means for pairing the second voice activity stream with the first voice activity stream if the first value is greater than the second value multiplied by a constant; and
means for designating the first voice activity stream as a singleton if the first value is not greater than the second value multiplied by the constant.

28. The system of claim 27, wherein the constant reflects a degree of confidence about a quality of a pairing of the first voice activity stream and the second voice activity stream.

29. The system of claim 19, further comprising:
means for removing rows and columns associated with the first voice activity stream and the second voice activity stream from a matrix, where the matrix is a pairwise similarity matrix after some time for all of the plurality of binary voice activity streams, each entry in the matrix indicating a complementary similarity between two corresponding binary voice activity streams of the plurality of binary voice activity streams.

* * * * *